United States Patent [19]

Hünten

[11] 4,390,427
[45] Jun. 28, 1983

[54] PLATE-TYPE FILTER

[75] Inventor: Dieter Hünten, Bergisch Gladbach, Fed. Rep. of Germany

[73] Assignee: Klöckner-Humboldt-Deutz Aktiengesellschaft, Cologne, Fed. Rep. of Germany

[21] Appl. No.: 301,317

[22] Filed: Sep. 11, 1981

[30] Foreign Application Priority Data

Sep. 13, 1980 [DE] Fed. Rep. of Germany ....... 3034678

[51] Int. Cl.³ .............................................. B01B 33/02
[52] U.S. Cl. ................................. 210/333.01; 210/391
[58] Field of Search ..................... 210/107, 108, 333.1, 210/333.01, 391, 392, 393

[56] References Cited

U.S. PATENT DOCUMENTS

| 2,712,387 | 7/1955 | Young | 210/392 |
| 3,081,876 | 3/1963 | Bizard | 210/107 |
| 3,357,566 | 12/1967 | Schmid et al. | 210/333.01 |
| 3,784,016 | 1/1974 | Akiyama | 210/333.1 |

FOREIGN PATENT DOCUMENTS

| 397908 | 9/1933 | United Kingdom | 210/392 |
| 1113114 | 5/1968 | United Kingdom | |

Primary Examiner—John Adee
Attorney, Agent, or Firm—Becker & Becker, Inc.

[57] ABSTRACT

A plate-type filter lubricating oil or the like. The filter includes a cylindrical, rotatable filter element which is to be cleaned in closed condition by flow reversal along a portion of the filter surface. During the normal operation the entire filter surface is to be effectively available. The device includes a rinsing channel wall having a U-shaped profile, one leg of which constantly engages against the filter element and consequently serves as a wiper body during rotation of the element. To clean the filter element, both legs are pressed against the element, so that a rinsing channel results which communicates with a rinse-out opening and represents a back or return flow through the filter surface. A combination of two such filters provides an advantageous device for machines that are continuously operated.

3 Claims, 5 Drawing Figures

PLATE-TYPE FILTER

The present invention relates to a plate-type filter for lubricating oil or the like, with partial return or back flow for self cleaning. The filter includes a cylindrical filter element rotatable in a cylindrical housing having an inlet and outlet opening arranged externally of the mantle surface of the filter element, which in turn has a rinse-out opening in one face plate thereof; a wiper body engages along one mantle region of the filter element, and a rinsing channel wall with a U-shaped cross section is open toward the rinse-out opening and spans a segment of the filter element.

A plate-type filter of this general type is disclosed by British Pat. No. 1,113,114. This arrangement has the considerable drawback that the rinsing channel wall does not engage sealingly against the filter element, so that a continuous leakage oil loss occurs from the outer annular chamber externally of the filter element toward the rinsing channel. This effects an undesired pressure loss at the filter. A further disadvantage is that the surface of the entire filter element is never available for filtering purposes, but rather a segment is continuously closed by the wiper body and has flow therethrough in the reverse direction from the inside to the outside. Consequently, the filter is to be a arranged larger with a completely engageable filter insert compared with the foregoing.

It is an object of the present invention to provide a filter which can be cleaned during operation and which in continuous operation has a maximum filter surface with respect to the overall dimensions, permits only minimum leakage oil losses, and is distinguished by its simple and operationally reliable construction.

This object, and other objects and advantages of the present invention, will appear more clearly from the following specification in connection with the accompanying drawing, in which.

Figure 1:
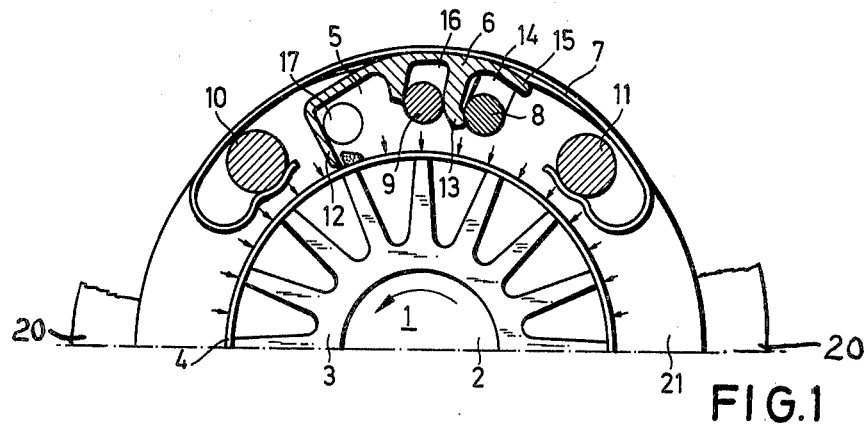
FIG. 1 shows a cross section through one embodiment of the inventive plate-type filter during normal operation thereof.

The filter of the present invention is characterized primarily in that the leg of the rinsing channel wall which is to the rear when viewed in the direction of rotation, forms the wiper body and is in constant engagement with the filter element; furthermore the rinsing channel wall has an adjustment member for lifting the front leg from, and pressing it against, the filter element; the rinse-out opening is provided with a valve which can be opened for the rinsing procedure.

During continuous operation, the valve at the rinse-out opening is closed, and the front edge of the rinsing channel wall is at a distance from the filter element. The dirty oil entering through the inlet opening in the housing externally of the filter element has access to the entire periphery of the filter element and flows through the element at uniform pressure distribution over the entire surface. Thus, the greatest possible throughput quantity, or the least pressure loss, is provided in an advantageous manner at prescribed external dimensions of the filter. The filtered oil leaves the interior of the filter at a face surface thereof, and suitably enters a collecting chamber after leaving the housing by way of and through an outlet.

In the first operation of cleaning the filter, the filter element is rotated by at least 360° in the prescribed direction upon its axis by means of a handwheel or the like arranged externally of the housing, whereby the dirt deposited externally on the filter elements accumulates ahead of the wiper body along the adjoining edge of the rinsing channel wall. The filter remains in operation in an unchanged manner with a once again cleaned filter element. Preferably directly after this wiping procedure, the front edge of the rinsing channel wall is pressed by means of the adjustment device against the filter element, and the valve at the rinse-out opening is opened. Consequently, the rinsing-out procedure starts, according to which the clean oil in the interior of the filter element, which clean oil is at a higher pressure compared with the rinsing-out return, passes in the region of the rinsing channel as a return flow through the corresponding segment of the filter element, carrying along the dirt accumulated by the wiper body on out of the rinsing channel. During wiping-off of the dirt, there exists the danger that individual dirt particles may be pressed into the filter gap, where they could settle. This can be eliminated by rotating the filter element a further 360° during the rinsing-out procedure, so that rinsing-out occurs through every region of the plate-type cylinder. The pressure loss subsequently measurable at the filter thus again reaches according to measurements the readjusted condition.

A special advantage of the arrangement of the present invention is that first the entire filter surface is completely cleaned again by the wiper before, for rinsing out the dirt, the filter surface is reduced slightly around the segment adjoining the rinsing channel. The higher pressure loss through the reduced filter surface therefore occurs only with a clean filter, and is smaller than with an extremely dirty filter element having full flow therethrough. After the short rinsing procedure, the valve is closed again and the rinsing channel wall is lifted again by the adjustment member at the front edge until the next cleaning procedure of the filter.

According to an especially advantageous inventive embodiment of the rinsing channel wall and of the adjustment member, a spring supported against the housing is arranged externally of the rinsing channel for pressing the rinsing channel wall against the filter element; furthermore within the rinsing channel or an extension attached to the rinsing channel wall, there is located a cam, which is rotatable by an axially parallel rod, for lifting the rinsing channel wall from the filter element; and furthermore, the movable leg of the rinsing channel wall, at least at the front ends, has a guide which slides on pins secured to the housing, or slides along an axially parallel rod; the guide is arranged at an angle to the radial, and is inclined inwardly toward the rear leg of the rinsing channel wall. This provides on the one hand, by means of a rod and cam, a simple adjustment member which can cooperate especially advantageously with a single curved steel wire in the form of a spring, and on the other hand, by means of the inclined arrangement of the guide, there results the special advantage for the rinsing-out procedure that the wiping body removes itself a short distance from the accumulated dirt during pressing into engagement of the rinsing channel wall tangentially against the filter element, whereby this dirt lies free in the rinsing channel and the danger is reduced that a portion of the dirt is incompletely rinsed-out along an edge. In an especially advantageous embodiment, respective axially parallel rods or pins are mounted in the face surfaces of the filter for holding the spring, for guiding the rinsing channel, and for adjusting the cam. The inventive embodiment represents a simple and operationally reliable arrangement.

According to another embodiment of the present invention, the rear leg of the rinsing channel wall, which leg acts as a wiper body, in the longitudinal section has a surface profile which complements the surface profile of a longitudinal section of the plate-type cylinder as far as to the filter gap.

The entire arrangement is preferably provided for wire plate-type filters, according to which a smooth edge of the wiping body assures a satisfactory wiping on the plate-type cylinder. This is the simplest and least complicated embodiment. In so far as a different construction is provided in place of a wire net for the plate-type cylinder, for instance discs having different diameters and provided with recesses and arranged in layers, the surface of the wiper body is correspondingly embodied, for instance as a comb which engages the recessed areas of the plate-type cylinder.

Referring now to the drawing in detail, the filter element 1 in FIG. 1 comprises a rotational axis 2, a carrier star or support 3, and the gap or plate-type cylinder 4. The filter element 1 is rotatable relative to a face plate 21 of member 20 fixed to the housing; this plate 21 of member 20, together with a further front face plate 19, carries or supports the pins or rods 8, 9, 10, 11. A spring 7 is held by two axially-parallel rods 10 and 11; this spring 7 presses the rinsing channel wall 6 against the filter element 1. That leg 12 of the rinsing channel wall 6 which is to the rear when viewed in the direction of rotation, engages the plate-type cylinder 4, while the front leg 13 is lifted from the filter element by the cam 14 of the adjustment member. The rinse-out opening 17 is arranged in the face plate 20 and, axially viewed, inside the rinsing channel 5. Dirty oil from outside the plate-type cylinder 4 enters the plate-type filter through a non-illustrated inlet in the housing; the dirty oil flows through the filter element from the outside to the inside over the entire periphery thereof. If a predetermined time of operation has elapsed, or the greatest permissible degree of filter contamination or dirtiness has occurred, the filter element 1 is rotated in the direction indicated by the arrow at least 360 degrees upon the rotational axis 2. In so doing, the dirt deposited on the plate-type cylinder 4 collects on the wiper body.

Figure 2:
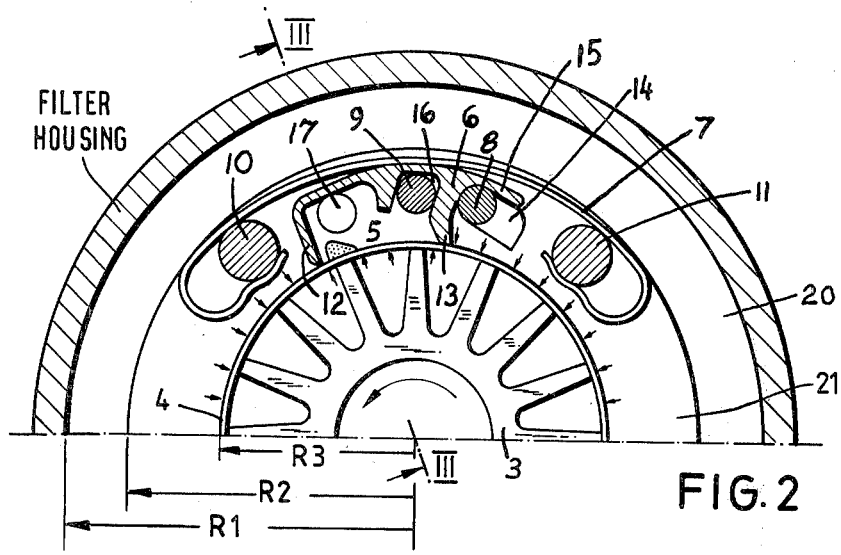
FIG. 2 shows a cross section through the plate-type filter during the rinsing procedure.
Figure 3:
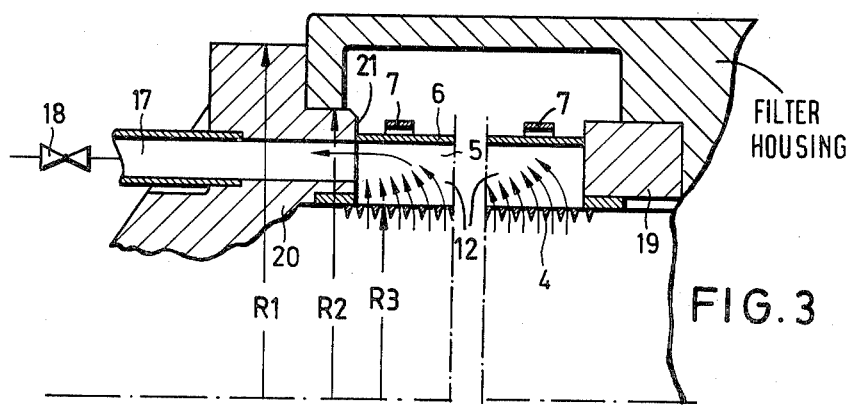
FIG. 3 shows a longitudinal section through the plate-type filter, and is taken along line III—III in FIG. 2.

FIG. 2 shows the second phase of the cleaning procedure, according to which, by rotating the cam 14 with the rod 8, also the front edge 13 of the rinsing channel wall 6 is brought by spring 7 into engagement against the plate-type cylinder 4, the latter being designated in a lower left corner of FIGS. 1 and 2 as well as in FIG. 3. As a result, the rinsing channel 5 as such is closed off, and in the particular section of the plate-type cylinder 4 being handled, dirty oil no longer flows in. After opening the valve 18 at the rinse-out opening 17, there occurs in this segment a reversed through-flow from the interior of the plate-type cylinder 4 into the interior of the rinsing channel 5 and toward the rinse-out opening 17. During a pivoting away of the cam 14 from the extension 15 on the rinsing channel wall 6, this wall moves along a path prescribed by cooperation of the guide rod 9 and the guide 16. This radial movement of the guide 16 simultaneously generates a tangential movement, whereby the wiper body is moved away from the collected dirt in the direction of rotation. Consequently, accumulation of the dirt in the edge formed by the plate-type cylinder and the wiper body is avoided. After rinsing out the dirt, which can be enhanced by a further rotation of the plate-type cylinder by 360°, the reverse flow is interrupted by closing the valve 18 and, by rotating the adjustment member, the normal filter flow is re-established again also in the region of the rinsing channel 5.

FIG. 3 shows the face plate 20, an oppositely located second face plate 19, and the plate-type cylinder 4 which is rotatable relative thereto. The rinse-out opening 17 is in the left face plate 20, with the valve 18 therebehind. The end surfaces of the face plates are fixed at a distance from one another corresponding approximately to the length of the rinsing channel wall 6. The face plates, which are fixed to the housing, are normally not themselves parts of the housing, but rather are only the supports for the rotational axes as well as for the rods 8, 9, 10, 11; these face plates are embodied in such a way as to be removable as a unit with the filter element 1 from the housing of the filter. Consequently, the rinsing channel wall 6 does not have to be repositioned relative to the filter element 1 after inspection of the filter element for damage or the like.

Figure 2A:
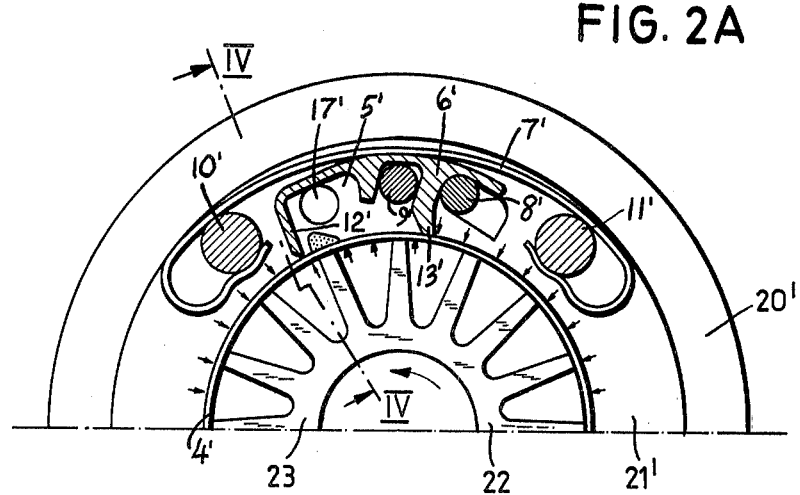
FIG. 2A shows a cross section similar to that of FIG. 2 with one lamination or disc visible to the left though partially broken away to show another lamination to the right thereof.

FIG. 2A has primes added to reference numeral designations corresponding to those of FIGS. 1, 2 and 3; one lamination or disc 23 is visible to the left though partially broken away to show another lamination or disc 22 to the right thereof.

Figure 4:
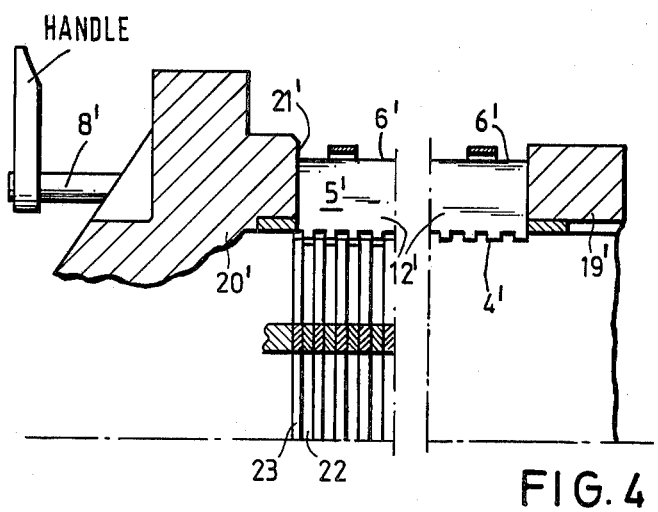
FIG. 4 shows a cross section through structure in a view taken along line IV—IV in FIG. 2A.

As shown in FIG. 4, the surface of the wiper body, i.e. the rear leg 12' of wall 6', need not necessarily be smooth. Rather, this surface can correspond to the configuration of the plate-type filter. Thus, for example, if the filter is comprised of lamination or discs 22 and 23 having different diameters, the correspondingly embodied wiper body surface would be in the form of a comb in order to properly engage the surface of the filter.

The present invention is, of course, in no way restricted to the specific disclosure of the specification and drawing, but also encompasses any modifications within the scope of the appended claims.

What is claimed is:

1. A plate-type filter for filtering dirt from a medium, said filter intended for insertion in a cylindrical housing which has an inlet for dirty medium and an outlet for filtered medium, said filter comprising:
   two face plates which are spaced from one another and are secured to said housing, one of said face plates being provided with a rinse-out opening which is in communication with said outlet of said housing;
   a valve operatively connected to said rinse-out opening for opening and closing same;
   a cylindrical filter element comprising a plate-type cylinder which has a cylindrical outer surface, said cylinder being rotatably arranged in said housing between said face plates, and being in communication with said inlet of said housing for receiving dirty medium within said cylinder;

a U-shaped piece which is open toward said rinse-out opening and spans a portion of said cylindrical outer surface of said cylinder, said U-shaped piece, when viewed in the direction of rotation of said cylinder, having a front leg and a rear leg, said rear leg forming a wiper body and being in constant engagement with an axial length of said cylindrical surface of said cylinder; and an adjustment member associated with one of said face plates and with said U-shaped piece for lifting said front leg from said cylindrical surface of said cylinder, and for pressing said front leg against said cylindrical surface to form a rinsing channel defined by said face plates, said cylindrical surface of said cylinder, and said U-shaped piece, said rinsing channel being in communication with said rinse-out opening for receiving a partial reverse flow of filtered medium from within, and through that portion of, said cylindrical surface of said cylinder spanned by said U-shaped piece for effecting cleaning of said cylindrical surface.

2. A filter according to claim 1, which includes a spring arranged radially outwardly of said rinsing channel between said U-shaped piece and said housing, said spring being supported against said housing and serving to press said front leg of said U-shaped piece against said cylindrical surface of said cylinder; in which said adjustment member comprises a rod located radially inwardly of said spring and connected to at least one of said face plates, and a cam connected to and rotated by said rod for lifting said front leg from said cylindrical surface of said cylinder; and which includes a pin associated with said front leg for slidably guiding same therealong, said front leg extending at an angle to the radial, and being inclined radially inwardly toward said rear leg of said U-shaped piece.

3. A filter according to claim 2, in which a longitudinal section of said rear leg of said U-shaped piece has a surface profile which complements the surface profile of a longitudinal section of said cylinder.

* * * * *